United States Patent
Oouchi

(10) Patent No.: US 6,356,207 B1
(45) Date of Patent: Mar. 12, 2002

(54) DSRC CAR-MOUNTED EQUIPMENT

(75) Inventor: Jun Oouchi, Tokyo (JP)

(73) Assignee: Mitsubishi Denki Kabushki Kaisha, Tokyo (JP)

( * ) Notice: Subject to any disclaimer, the term of this patent is extended or adjusted under 35 U.S.C. 154(b) by 34 days.

(21) Appl. No.: 09/640,376

(22) Filed: Aug. 17, 2000

(30) Foreign Application Priority Data

Apr. 3, 2000 (JP) ........................................ 2000-100582

(51) Int. Cl.[7] ................................................. G08G 1/00
(52) U.S. Cl. ...................... 340/928; 340/10.3; 340/933; 235/384; 455/99; 455/105; 701/36
(58) Field of Search ................................ 340/928, 933, 340/942, 825.39, 902, 10.3, 906; 701/32, 36, 117; 455/99, 105, 107, 447, 446; 235/384

(56) References Cited

U.S. PATENT DOCUMENTS

| | | | |
|---|---|---|---|
| 5,751,227 A | * 5/1998 | Yoshida et al. | 340/928 |
| 5,955,969 A | * 9/1999 | D'Hont | 340/928 |
| 5,963,149 A | * 10/1999 | Nagura et al. | 340/933 |
| 6,064,320 A | * 5/2000 | d'Hont et al. | 340/933 |
| 6,081,718 A | * 6/2000 | Ando et al. | 455/447 |
| 6,300,882 B1 | * 10/2001 | Inoue | 340/933 |

FOREIGN PATENT DOCUMENTS

JP    8-307332    11/1996    ............ H04B/7/06

* cited by examiner

Primary Examiner—Edward Lefkowitz
Assistant Examiner—Davetta W. Goins
(74) Attorney, Agent, or Firm—Sughrue Mion, PLLC

(57) ABSTRACT

A DSRC car-mounted equipment which self-diagnoses its communication function and informs the driver of the result, comprising a first local oscillator 30 for generating a car-mounted equipment frequency fosc, a demodulator 16 for detecting the electric field intensity HE and for picking up reception data D1, a car-mounted controller 40 for fetching the reception data by changing over the transmission/reception change-over switch SW1 and for sending transmission data D2, a second local oscillator 31 that outputs a frequency for detecting abnormal condition corresponding to an on-the-road equipment frequency fs, and means for judging the condition of the transmission/reception circuit using the frequency for judging abnormal condition, wherein the transmission/reception change-over switch is connected to the reception circuit, abnormal condition is judged from at least either the electric field intensity or the reception data detected based on a leakage power of the frequency for detecting abnormal condition, and information output means 50 is driven.

10 Claims, 5 Drawing Sheets

DSRC CAR-MOUNTED EQUIPMENT

BACKGROUND OF THE INVENTION

1. Field of the Invention

The present invention relates to a DSRC (dedicated short-range communication) car-mounted equipment such as the one for collecting the toll used for an ETC (electronic toll collection) system in an ITS (intelligent transport system). More specifically, the invention relates to a DSRC car-mounted equipment which diagnoses disorder related to the collection of toll through the transmission/reception circuit to inform abnormal condition.

2. Prior Art

There has heretofore been known a DSRC car-mounted equipment (hereinafter often referred to simply as "car-mounted equipment") that executes communication with an on-the-road equipment installed on a road on which a vehicle travels to transmit and receive various data.

In the DSRC car-mounted equipment and, particularly, in the ETC car-mounted equipment of this kind, the ETC function is invalidated when a transmission/reception circuit in the car-mounted equipment is not working well, which may become a cause of vehicle jamming at the toll gate. It is, therefore, desired that the function of the transmission/reception circuit is automatically checked in advance and that the driver is informed of the checked result.

In a device taught in, for example, Japanese Unexamined Patent Publication (Kokai) No. 307332/1996, the communication probability is operated by the on-the-road equipment based upon the communication between the on-the-road equipment and the car-mounted equipment to judge the disorder of the on-the-road equipment.

However, the device disclosed in the above publication has not been equipped with a function for judging the disorder of the transmission/reception circuit of the car-mounted equipment.

As described above, the conventional DSRC car-mounted equipment is not capable of checking the function of the transmission/reception circuit in the car-mounted equipment, and is not, hence, capable of informing the driver of the checked result.

SUMMARY OF THE INVENTION

The present invention was accomplished in order to solve the above-mentioned problem, and its object is to provide a DSRC car-mounted equipment which is capable of informing the driver of the condition of the data transmission/reception function to and from the on-the-road equipment, so that the driver will not enter into the toll road without knowing the disorder of the circuitry of the car-mounted equipment.

A DSRC car-mounted equipment according to the present invention comprises:
- a transmission/reception antenna for executing communication with an on-the-road equipment installed on a road;
- a transmission/reception change-over switch for changing over the transmission/reception function of the transmission/reception antenna;
- a transmission/reception circuit including a reception circuit and a transmission circuit selectively connected to the transmission/reception antenna via the transmission/reception change-over switch;
- a first local oscillator for generating a car-mounted equipment frequency related to the transmission/reception circuit;
- a demodulator for detecting the electric field intensity and for picking up reception data from a signal received by the reception circuit;
- a car-mounted controller for fetching the reception data by controlling the change-over of the transmission/reception change-over switch, and for sending transmission data to the transmission circuit;
- an information output means connected to the car-mounted controller; and
- a second local oscillator that outputs, to the transmission circuit, a frequency for detecting abnormal condition corresponding to an on-the-road equipment frequency transmitted from the on-the-road equipment; wherein the car-mounted controller includes an abnormal circuit judging means for judging the condition of the transmission/reception circuit by using the frequency for detecting abnormal condition; and the abnormal circuit judging means judges the transmission/reception circuit to be abnormal and drives the information output means when at least either the electric field intensity or the reception data detected based upon a leakage power of the frequency for detecting abnormal condition is not satisfying a predetermined condition in a state where the transmission/reception change-over switch is connected to the reception circuit.

The DSRC car-mounted equipment according to the present invention further comprises an abnormal condition detector switch which selectively connects the first or the second local oscillator to the transmission circuit; wherein the second local oscillator outputs a frequency equal to the on-the-road equipment frequency as a frequency for detecting abnormal condition; and the abnormal circuit judging means judges the condition of the transmission/reception circuit by comparing the electric field intensity detected based on a leakage power of the frequency for detecting abnormal condition with a predetermined value in a state where the abnormal condition detector switch is connected to the second local oscillator side.

In the DSRC car-mounted equipment according to the present invention, the abnormal condition detector switch is connected to the second oscillator when the power source circuit is closed, the second local oscillator is driven when the power source circuit is closed, and the transmission circuit is turned off when the power source circuit is closed.

In the DSRC car-mounted equipment according to the present invention, the abnormal circuit judging means sends a predetermined data that has been set in advance to the transmission circuit, and judges the condition of the transmission/reception circuit by comparing the electric field intensity and the reception data with a predetermined value and the predetermined data, the electric field intensity and the reception data being detected based on a leakage power of a frequency for detecting abnormal condition ASK-modified with the predetermined data.

The DSRC car-mounted equipment according to the present invention further comprises:
- a mixer for detecting abnormal condition inserted between the first and second local oscillators and the transmission circuit; and
- a filter inserted between the mixer and the transmission circuit to permit the passage of the on-the-road equipment frequency and the car-mounted equipment frequency only; wherein the second local oscillator is selectively driven and outputs, as the frequency for detecting abnormal condition, an intermediate frequency which is a difference between the on-the-road equipment frequency and the car-mounted equipment frequency; and the abnormal circuit judging means judges the condition of the transmission/reception circuit by comparing the electric field intensity detected based on a leakage power of the frequency for detecting abnormal condition with a predetermined value when the second local oscillator is driven.

In the DSRC car-mounted equipment according to the present invention, the second local oscillator is driven when the power source circuit is closed, and the transmission circuit is turned off when the power source circuit is closed.

In the DSRC car-mounted equipment according to the present invention, the abnormal circuit judging means sends a predetermined data to the transmission circuit, and judges the condition of the transmission/reception circuit by comparing the electric field intensity and the reception data with a predetermined value and the predetermined data, the electric field intensity and the reception data being detected based on a leakage power of a frequency for detecting abnormal condition ASK-modified with the predetermined data.

In the DSRC car-mounted equipment according to the present invention, the first and second local oscillators include a common reference frequency oscillator for outputting a reference frequency inclusive of the intermediate frequency, the first local oscillator has a frequency multiplier for forming the car-mounted equipment frequency from the reference frequency, and the second local oscillator has a second filter for picking up the intermediate frequency from the reference frequency.

In the DSRC car-mounted equipment according to the present invention, the information output means includes at least either a buzzer or a display unit to inform the abnormal condition of the transmission/reception circuit by voice or display.

The DSRC car-mounted equipment according to the present invention further comprises an external storage medium connected to the car-mounted controller to transmit and receive data related to the toll collection, wherein the car-mounted controller exchanges the data related to the toll collection between the on-the-road equipment installed on a toll road and the external storage medium, and automatically executes the toll collection processing based on the data related to the toll collection.

DESCRIPTION OF THE PREFERRED EMBODIMENTS

Embodiment 1

An embodiment 1 of the invention will now be described with reference to the drawings.

Figure 1:
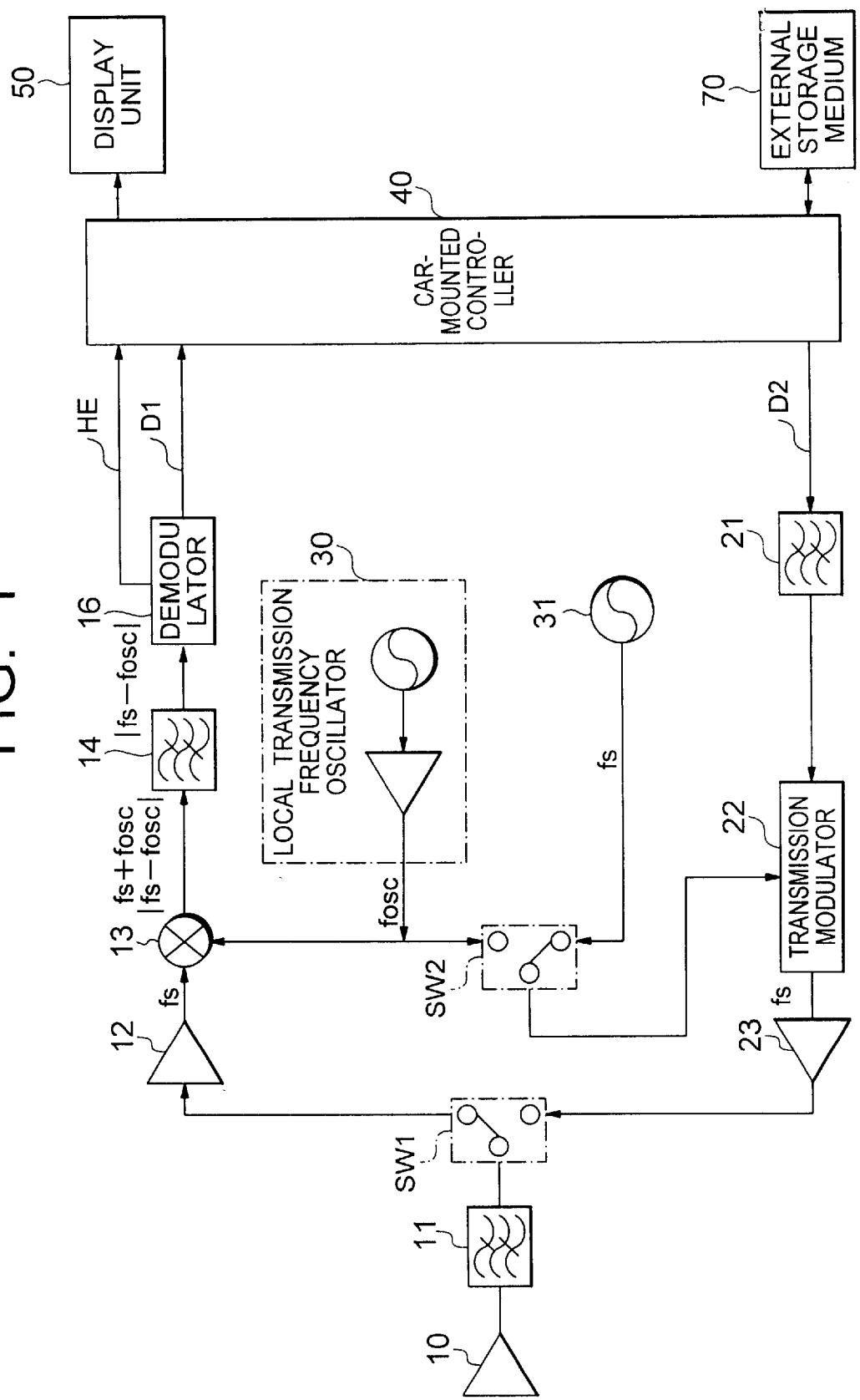
FIG. 1 is a block diagram schematically illustrating the constitution according to an embodiment 1 of the present invention.

FIG. 1 is a block diagram schematically illustrating the constitution of an embodiment of the invention. Described here is a case where an ETC car-mounted equipment is used as the DSRC car-mounted equipment, and the data communication for the automatic data collection is executed with an on-the-road equipment installed on a toll road.

In FIG. 1, a transmission/reception antenna 10 executes communication with the on-the-road equipment (not shown) installed on a road.

A filter 11 connected to the transmission/reception antenna 10 permits the passage of carrier waves transmitted from the on-the-road equipment, i.e., on-the-road equipment frequency fs and carrier waves transmitted from the car-mounted equipment, i.e., car-mounted equipment frequency.

A high-frequency switch, i.e., a transmission/reception change-over switch SW1 connected to the filter 11 is selectively connected to either a reception circuit or a transmission circuit constituting a transmission/reception circuit to change over the transmission/reception function of the transmission/reception antenna 10.

A reception amplifier 12, a reception mixer 13, a filter 14 and a demodulator 16 are constituting the reception circuit, and a filter 21, a transmission modulator 22 and a transmission amplifier 23 are constituting the transmission circuit.

A car-mounted local frequency oscillator 30 (hereinafter referred to simply as "local oscillator 30") which is a first local oscillator is related to the transmission/reception circuit, and outputs a transmission carrier wave from the car-mounted equipment, i.e., outputs the car-mounted equipment frequency fosc to the reception mixer 13 on the reception circuit side and to the transmission modulator 22 on the transmission circuit side.

The reception mixer 13 converts the frequency based on the frequencies fs and fosc, and produces added-up frequency (=fs+fosc) and a difference frequency between them, i.e., an intermediate frequency (=|fs−fosc|). The intermediate frequency |fs−fosc| is generally denoted as IF (intermediate frequency).

The filter 14 permits the passage of the intermediate frequency |fs−fosc| only among the above frequencies formed by the reception mixer 13.

The demodulator 16 detects the electric field intensity from the intermediate frequency |fs−fosc| through the filter 14, and produces an electric field intensity judgement signal HE and further picks up the reception data D1.

A car-mounted controller 40 includes various arithmetic processing means and a transmission/reception control unit, changes over the transmission/reception change-over switch SW1, fetches reception data D1 from the on-the-road equipment via the reception circuit, outputs the transmission data D2 to the on-the-road equipment via the transmission circuit, and, as required, outputs required data for detecting abnormal condition to the transmission modulator 22.

To the car-mounted controller 40 are connected a display unit 50 that works as information output means and an external storage medium 70 such as IC cards.

Another high-frequency switch, i.e., a switch SW2 for detecting abnormal condition is inserted between the local oscillator 30 and the transmission modulator 22.

The switch SW2 for detecting abnormal condition is connected at its common terminal to the transmission modulator 22 and is connected at its one selection terminal to the output terminal of the local oscillator 30.

The other selection terminal of the switch SW2 for detecting abnormal condition is connected to the output terminal of a local on-the-road frequency oscillator 31 (hereinafter simply referred to as "local oscillator 31") that serves as a second local oscillator.

The switch SW2 for detecting abnormal condition is usually connected to the local oscillator 30 side, and is connected to the local oscillator 31 side only when abnormal condition is detected.

The local oscillator outputs a frequency equal to the on-the-road equipment frequency fs as the frequency for detecting abnormal condition.

The car-mounted controller 40 includes an abnormal circuit judging means for judging the condition of the transmission/reception circuit by using the on-the-road equipment frequency fs (frequency for detecting abnormal condition) from the local oscillator 31.

That is, the abnormal circuit judging means in the car-mounted controller 40 detects at least either the electric field intensity judgement signal HE or the reception data D1 detected based on a leakage power of the on-the-road equipment frequency fs for detecting abnormal condition in a state where the transmission/reception change-over switch SW1 is connected to the reception circuit and the abnormal condition detector switch is connected to the local oscillator 31 side (shown).

When the detected signal fails to satisfy a predetermined condition (e.g., the electric field intensity is not in agreement with the predetermined value), the transmission/reception circuit is judged to be abnormal, and the information output means such as display unit 50 is driven.

Next, a normal transmission/reception operation of the embodiment 1 of the invention shown in FIG. 1 will be concretely described.

At the time of reception, first, the transmission/reception change-over switch SW1 is connected to the reception circuit side as shown. The abnormal condition detector switch SW2 is connected to the local oscillator 30 side (changed over to a state opposite to the one that is shown).

In this case, the filter 11 permits the on-the-road equipment frequency fs (e.g., 5.805 GHz) from the transmission/reception antenna 10 to pass through and to be input to the reception circuit.

The on-the-road equipment frequency fs is amplified through the reception amplifier 12 and is input to the reception mixer 13.

The reception mixer 13 further receives the car-mounted equipment frequency fosc (e.g., 5,845 GHz) from the local oscillator 30, and converts the on-the-road equipment frequency fs and the car-mounted equipment frequency fosc into two frequencies |fs±fosc|.

Then, the filter 14 permits the intermediate frequency |fs−fosc| (e.g., 40 MHz) only to pass through.

The demodulator 16 forms the electric field intensity judgement signal HE (electric field intensity detection voltage) and the reception data D1 from the intermediate frequency |fs−fosc|, and inputs them to the car-mounted controller 40.

The car-mounted controller 40 processes the electric field intensity judgement signal HE and the reception data D1, and executes the communication with the external storage medium 70.

The car-mounted controller 40 produces transmission data D2 and, as required, drives the display unit 50 or a buzzer (not shown) to let the vehicle driver informed of various information by display or voice.

At the time of transmission, the transmission/reception change-over switch SW1 is changed from a position that is shown over to the transmission circuit side.

Further, the abnormal condition detector switch SW2 is connected to the local oscillator 30 side like at the time of reception described above. Therefore, the transmission modulator 22 receives the car-mounted equipment frequency fosc from the local oscillator 30.

The transmission data D2 from the car-mounted controller 40 is cut for its high-frequency components through the filter 21 and is ASK-modulated (amplitude shift keying) with the car-mounted equipment frequency fosc.

The transmission data D2 ASK-modulated with the car-mounted equipment frequency fosc is amplified through the transmission amplifier 23, and is transmitted from the transmission/reception antenna 10 to the on-the-road equipment through the filter 11.

When the DSRC car-mounted equipment is the ETC car-mounted equipment, the communication signals are exchanged plural times between the on-the-road equipment and the car-mounted equipment at the time of transmission and reception according to a communication protocol for toll collection, and the communication of toll collection is completed.

In this case, the external storage medium 70 transmits and receives data related to the toll collection through the car-mounted controller 40, and the display unit 50 displays ETC data for toll collection.

The car-mounted controller 40 processes the data transmitted and received to and from the on-the-road equipment, exchanges the data related to the toll collection between the on-the-road equipment and the external storage medium 70, and automatically executes the toll collection processing based on these data.

Next, described below is the operation for detecting abnormal condition in the transmission/reception circuit according to the embodiment 1 of the invention.

First, described below is when detecting the disorder in the reception circuit.

The abnormal circuit judging means in the car-mounted controller 40 is driven when, for example, the power source circuit of the car-mounted equipment is closed, and connects the transmission/reception change-over switch SW1 to the reception circuit side and separates the transmission circuit away from the transmission/reception antenna 10 as shown.

Further, the abnormal circuit judging means drives the local oscillator 31 for detecting abnormal condition, and changes the abnormal condition detector switch SW2 over to the local oscillator 31 side as shown.

Thus, the on-the-road equipment frequency fs from the local oscillator 31 is input to the transmission modulator 22 side.

At this moment, the transmission modulator 22 and the transmission amplifier 23 remain turned off, and the transmission/reception change-over switch SW1 is separated away from the transmission circuit. However, the on-the-road equipment frequency fs for detecting abnormal condition is input, as leakage power, to the reception amplifier 12 side.

That is, the electric power of the on-the-road equipment frequency fs from the local oscillator 31 is input to the reception amplifier 12 leaking through the transmission modulator 22 and the transmission amplifier 23 that are in an off state and, further, leaking through the transmission/reception change-over switch SW1 set to the reception circuit side.

The leakage power of the on-the-road equipment frequency fs is converted for its frequency by the car-mounted equipment frequency fosc through the reception mixer 13 like during the normal reception, and the intermediate frequency |fs−fosc| that has passed through the filter 14 is input to the demodulator 16.

The demodulator 16 inputs the electric field intensity judgement signal HE of the intermediate frequency |fs−fosc| based on the leakage power and the reception data D1 to the car-mounted controller 40.

When the reception data D1 is not used for judging the abnormal condition, the electric field intensity judgement signal HE only may be input to the car-mounted controller 40.

The abnormal circuit judging means in the car-mounted controller 40 compares a predetermined value (electric field intensity detection voltage) that has been stored in advance before shipment with the electric field intensity judgement signal HE, and diagnoses the condition of the reception circuit in the car-mounted equipment depending upon whether they are in agreement.

The reception circuit is judged to be normal when the electric field intensity judgement signal HE detected by the leakage power is in agreement with the predetermined value, and is judged to be in bad condition when they are not in agreement with each other. The driver of the vehicle is informed of the judged result through the display unit 50 or the like.

Thus, the frequency for detecting abnormal condition equal to the transmission frequency of the on-the-road equipment is formed in the car-mounted equipment at the time of closing the power source circuit, the on-the-road equipment frequency fs and the car-mounted equipment frequency fosc are falsely converted, and the electric field intensity judgement signal HE obtained from the intermediate frequency |fs−fosc| is compared with the electric field intensity detection voltage, making it possible to quickly recognize the disorder in the local oscillator 30 necessary for the transmission and reception and in the reception circuit.

Upon using the ETC car-mounted equipment that collects the toll by exchanging the data for toll collection with the on-the-road equipment installed at a toll gate of a toll road, therefore, the driver who has recognized the disorder in the reception circuit in advance may use an ordinary traveling lane at the toll gate to preclude a cause of traffic jam in advance.

When it is confirmed that the circuitry of the car-mounted equipment is normal, the driver may use an ETC lane at the toll gate to effectively utilize the ETC function, so that the toll is automatically collected based on the communication data with the on-the-road equipment.

Here, the abnormal condition of the reception circuit is detected based only upon the electric field intensity judgement signal HE. Therefore, the transmission modulator 22 is turned off to detect the leakage power. Here, however, when at least the transmission amplifier 23 is turned off, then, the transmission modulator 22 may be maintained turned on.

Further, though the DSRC car-mounted equipment was used as the ETC car-mounted equipment, any other DSRC car-mounted equipment may be used to self-diagnose the circuit condition in advance by using the local oscillator 31 that generates local frequency in the car-mounted equipment to obtain the same actions and effects.

Embodiment 2

In the above-mentioned embodiment 1, abnormal condition in the circuitry of the car-mounted equipment was judged by using the electric field intensity judgement signal HE only. However, the reception data D1 based on the leakage power may be used instead.

In this case, the abnormal circuit judging means in the car-mounted controller 40 executes the operation for detecting disorder in the transmission circuit in addition to the operation for detecting disorder in the reception circuit when the power source circuit is closed.

That is, the abnormal circuit judging means drives the filter and the transmission modulator 22 in the transmission circuit, sends a predetermined data that has been set in advance, as transmission data D2 for detecting abnormal condition, to the transmission circuit (transmission modulator 22), and ASK-modulates the on-the-road equipment frequency fs for detecting abnormal condition with predetermined data.

Here, though the transmission amplifier 23 is turned off, the on-the-road equipment frequency fs ASK-modulated through the transmission modulator 22 leaks into the reception amplifier 12 in the same manner as described above with its electric power gradually attenuating, despite the transmission amplifier 23 is turned off and the transmission/reception change-over switch SW1 is set to the reception circuit side.

The reception mixer 13 converts the frequency of the leakage power with the car-mounted equipment frequency fosc, and the demodulator 16 detects the electric field intensity judgement signal HE, detects the ASK-modulated transmission data D2 as reception data D1 and inputs them to the car-mounted controller 40.

Therefore, the abnormal circuit judging means compares the electric field judgement signal HE and the reception data D1 detected based on the leakage power of the on-the-road equipment frequency fs ASK-modulated with predetermined data, with the predetermined value and the predetermined data to judge the condition of the transmission/reception circuit.

For example, when the electric field intensity judgement signal HE and the reception data D1 are not in agreement with the predetermined value and the predetermined data, it is so judged that the transmission/reception circuit (transmission circuit or reception circuit) is in bad condition, and the display unit 50 or the buzzer is driven to inform the driver of the abnormal condition.

When the result of comparison of the electric field intensity judgement signal HE and the electric field intensity detection voltage, and the result of collation of the reception data D1 and the transmission data D2 (predetermined data), are all in agreement, then, the transmission/reception circuit is judged to be in normal condition.

Embodiment 3

The above-mentioned embodiment 1 has employed the local oscillator 31 that outputs the on-the-road equipment frequency fs as the local frequency oscillator for detecting abnormal condition. It is, however, also allowable to use a local oscillator that outputs the intermediate frequency |fs−fosc| as a frequency for detecting abnormal condition.

Figure 2:
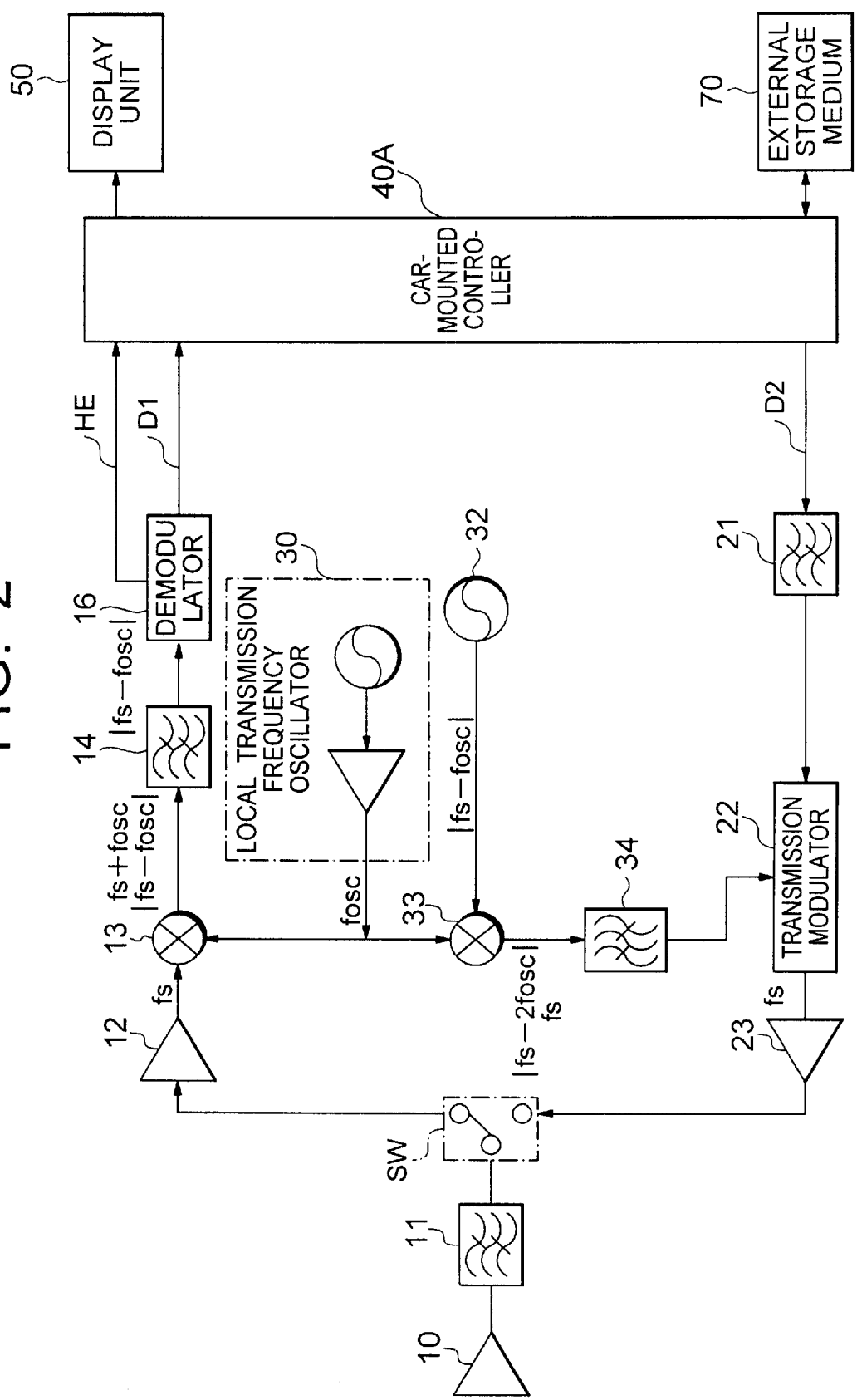
FIG. 2 is a block diagram schematically illustrating the constitution according to an embodiment 3 of the present invention.

FIG. 2 is a block diagram illustrating an embodiment 3 of the invention using a local oscillator that outputs the intermediate frequency |fs−fosc|, and wherein the portions similar to those described above (see FIG. 1) are denoted by the same reference numerals, and the portions corresponding to those described above are denoted by the same reference numerals but to which are attached "A" but are not described again in detail.

In FIG. 2, the local oscillator 32 for detecting abnormal condition is selectively driven by the car-mounted controller 40A and produces an intermediate frequency |fs−fosc| which is a difference between the on-the-road equipment frequency fs and the car-mounted equipment frequency fosc as a frequency for detecting abnormal condition.

The mixer 33 for detecting abnormal condition is inserted between the local oscillators 30, 32 and the transmission circuit (transmission modulator 22).

A filter 34 inserted between the mixer 33 and the transmission modulator 22 permits the passage of the on-the-road equipment frequency fs and the car-mounted equipment frequency fosc only.

The filter 34 permits the passage of the car-mounted equipment frequency fosc from the local oscillator 30 during the normal transmission, and permits the passage of the on-the-road equipment frequency fs which is a difference between the car-mounted equipment frequency fosc and the intermediate frequency |fs−fosc| when abnormal condition is detected.

When the power source circuit is closed, the abnormal circuit judging means in the car-mounted controller 40A drives the local oscillator 32 to form the intermediate frequency |fs−fosc| and compares the electric field intensity detected based on the leakage power of the frequency (on-the-road equipment frequency fs) for detecting abnormal condition through the filter 34 with the predetermined value, in order to judge the condition of the transmission/reception circuit.

When abnormal condition in the reception circuit only is to be detected based on the electric field intensity judgement signal HE in a manner as described above, the transmission circuit is turned off when the power source circuit is closed.

When abnormal condition is to be detected not only in the reception circuit but also in the transmission circuit, the abnormal circuit judging means drives the transmission modulator 22, outputs a predetermined data to the transmission circuit, compares the electric field intensity and reception data D1 detected based on the leakage power of the frequency for detecting abnormal condition ASK-modulated with the predetermined data, with the predetermined value and the predetermined data to judge the condition of the transmission/reception circuit.

The operation for detecting abnormal condition of the embodiment 3 of the invention shown in FIG. 2 will now be described in detail with reference to flowcharts of FIGS. 3 and 4.

Figure 3:
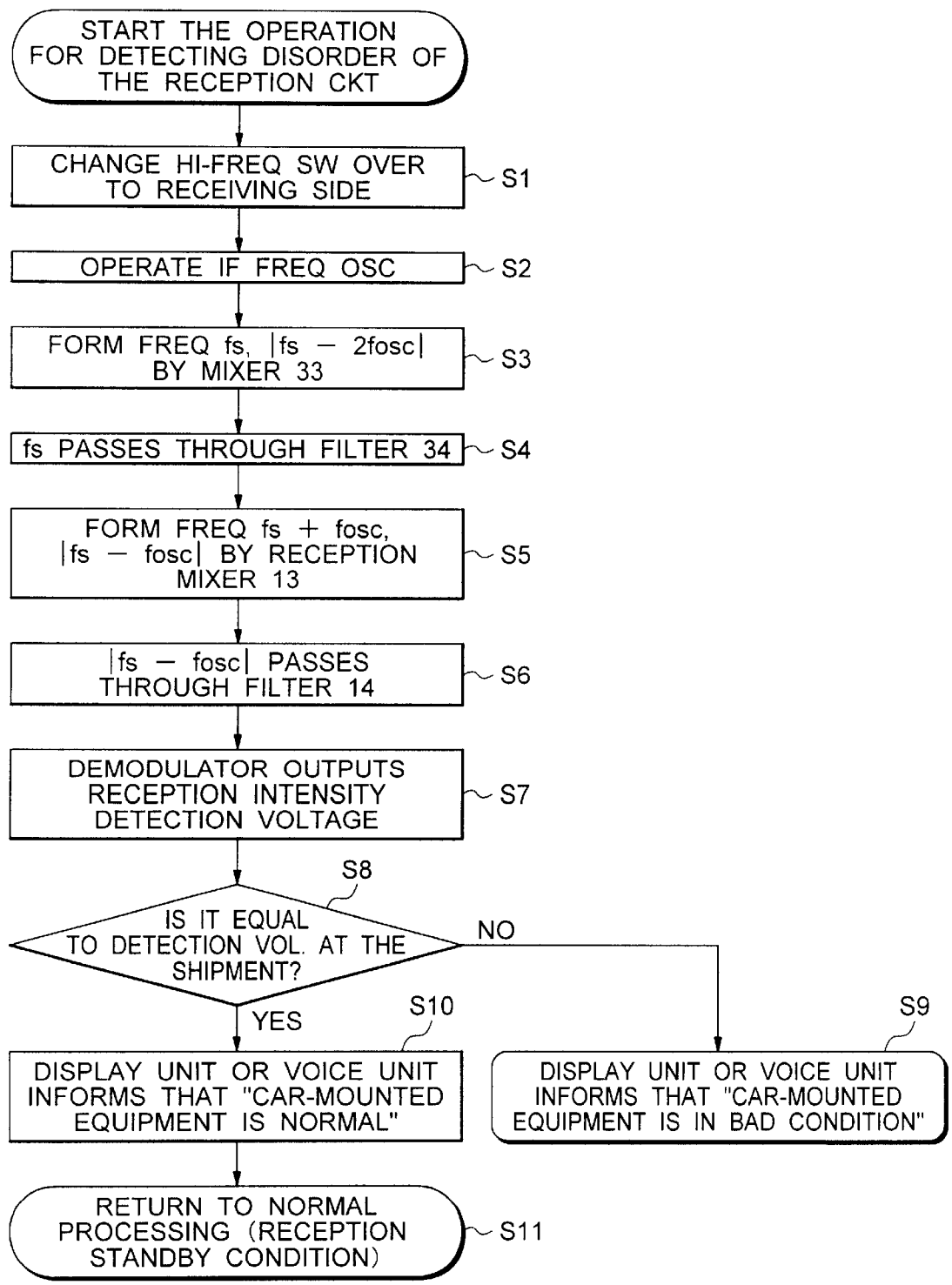
FIG. 3 is a flowchart illustrating the operation for detecting abnormal condition according to the embodiment 3 of the present invention.

First, described below with reference to FIG. 3 is a case for judging disorder in the reception circuit that is at least necessary for executing the communication with the on-the-road equipment.

In FIG. 3, the abnormal circuit judging means turns the transmission modulator 22 and the transmission amplifier 23 off, changes the transmission/reception change-over switch SW1 over to the reception side (step S1) when the power source circuit is closed, and drives the local oscillator 32 that produces the intermediate frequency |fs−fosc| (step S2).

Then, the mixer 33 for detecting abnormal condition converts the frequency based on the car-mounted equipment frequency fosc from the local oscillator 30 and on the intermediate frequency |fs−fosc| from the local oscillator 32 to form two frequencies |fs−fosc±fosc| (=|fs−2fosc|, fs)(step S3).

Here, the filter 34 permits the on-the-road equipment frequency fs only to pass through to falsely form the on-the-road equipment frequency fs in the car-mounted equipment (step S4).

Then, the leakage power due to the on-the-road equipment frequency fs is input to the reception mixer 13 through the reception amplifier 12 in a manner as described above.

The reception mixer 13 converts the frequency based on the on-the-road equipment frequency fs due to leakage power and on the car-mounted equipment frequency fosc, to form two frequencies |fs±fosc| (step S5).

The filter 14 permits the passage of the intermediate frequency |fs−fosc| between the above two frequencies (step S6), and the demodulator 16 outputs the electric field intensity judgement signal HE as a reception intensity detection voltage (step S7).

The abnormal circuit judging means in the car-mounted controller 40A judges whether the reception intensity detection voltage (electric field intensity judgement signal HE) is equal to the detection voltage at the time of shipment of the car-mounted equipment (step S8).

When it is judged at step S8 that the electric field intensity judgement signal HE is not in agreement with the predetermined value (i.e., NO), the display unit 50 or a voice unit (not shown) is driven to inform that "the car-mounted equipment is in bad condition" (step S9), and the processing routine of FIG. 3 ends.

When it is judged at step S8 that the electric field intensity judgement signal HE is in agreement with the predetermined value (i.e., YES), the display unit 50 or the voice unit is driven to inform that "the car-mounted equipment is normal" (step S10), and the routine returns to normal processing to assume the reception standby state (step S11).

Thus, it is attempted to detect disorder in the local oscillator 30 necessary for the reception circuit and the transmission circuit. When the local oscillator 30 is in bad condition, the display unit 50 (or the voice unit) informs the driver of disorder.

During the normal transmission after the car-mounted equipment is judged to be in normal condition, the local oscillator 32 is turned off, and the intermediate frequency |fs−fosc| is not produced by the local oscillator 32. Accordingly, the car-mounted equipment frequency fosc from the local oscillator 30 enters into the transmission modulator 22 passing through mixer 33 and filter 34, modulated with the transmission data D2, and is transmitted from the transmission/reception antenna 10 to the on-the-road equipment without any trouble.

Here, in order to effectively use the ETC function in the car-mounted equipment that is normally functioning, the car-mounted equipment frequency fosc of the local oscillator 30 passing through the mixer 33 is so controlled as will not develop power loss as much as possible. Therefore, the data related to the toll collection can be reliably exchanged between the car-mounted equipment and the on-the-road equipment.

Next, the operation for judging disorder in the reception circuit and in the transmission circuit will be described with reference to FIG. 4.

Figure 4:
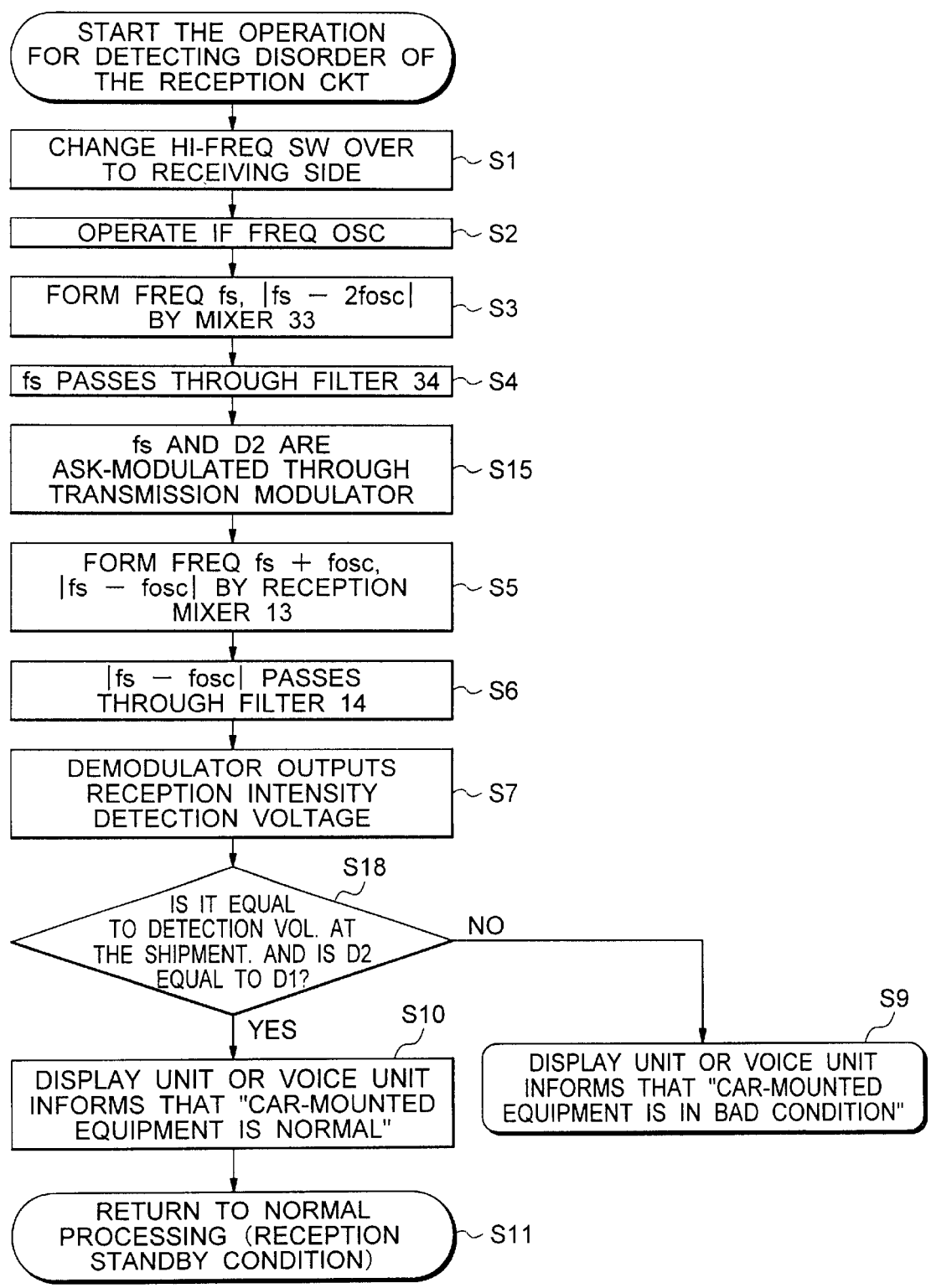
FIG. 4 is a flowchart illustrating the operation for detecting abnormal condition according to the embodiment 3 of the present invention.

In FIG. 4, the steps S1 to S7 and S9 to S11 are the same as those described above (see FIG. 3) and are not described here in detail.

Step 18 in FIG. 4 is corresponding to step S8 described above. In this case, the filter 21 and the transmission modulator 22 in the transmission circuit are driven even when abnormal condition is detected.

When the power source circuit of the car-mounted equipment is closed, the abnormal circuit judging means in the car-mounted controller 40A executes steps S1 to S4 for detecting disorder in the transmission/reception circuit, produces transmission data D2 constituted by predetermined data, so that the transmission data D2 as well as the on-the-road equipment frequency fs are ASK-modulated through the transmission modulator 22 (step S15).

Then, leakage power reception processing steps S5 to S7 are executed, and it is judged whether the reception intensity detection voltage (electric field intensity judgement signal HE) is equal to the detection voltage (predetermined value) at the time of shipment, and whether the reception data D1 is equal to the transmission data D2 (step S18).

When it is judged at step S18 that the electric field intensity judgement signal HE is not in agreement with the predetermined value, or that the reception data D1 is not in agreement with the transmission data D2 (i.e., NO), then, it is informed that the "car-mounted equipment is in bad condition" (step S9).

When it is judged at step S18 that the electric field intensity judgement signal HE is in agreement with the predetermined value, and that the reception data D1 is in agreement with the transmission data D2 (i.e., YES), then, it is informed that the "car-mounted equipment is normal" (step S10), and the routine proceeds to step S11.

Thus, it is attempted to detect disorder in the local oscillator 30 that is necessary for the transmission/reception circuit and for the transmission and reception. When disorder is detected, the display unit 50 (or the voice unit) informs the driver of disorder.

Embodiment 4

In the above-mentioned embodiment 3, the local oscillators 30 and 32 were separately provided. However, a single reference frequency oscillator may be used in common.

Figure 5:
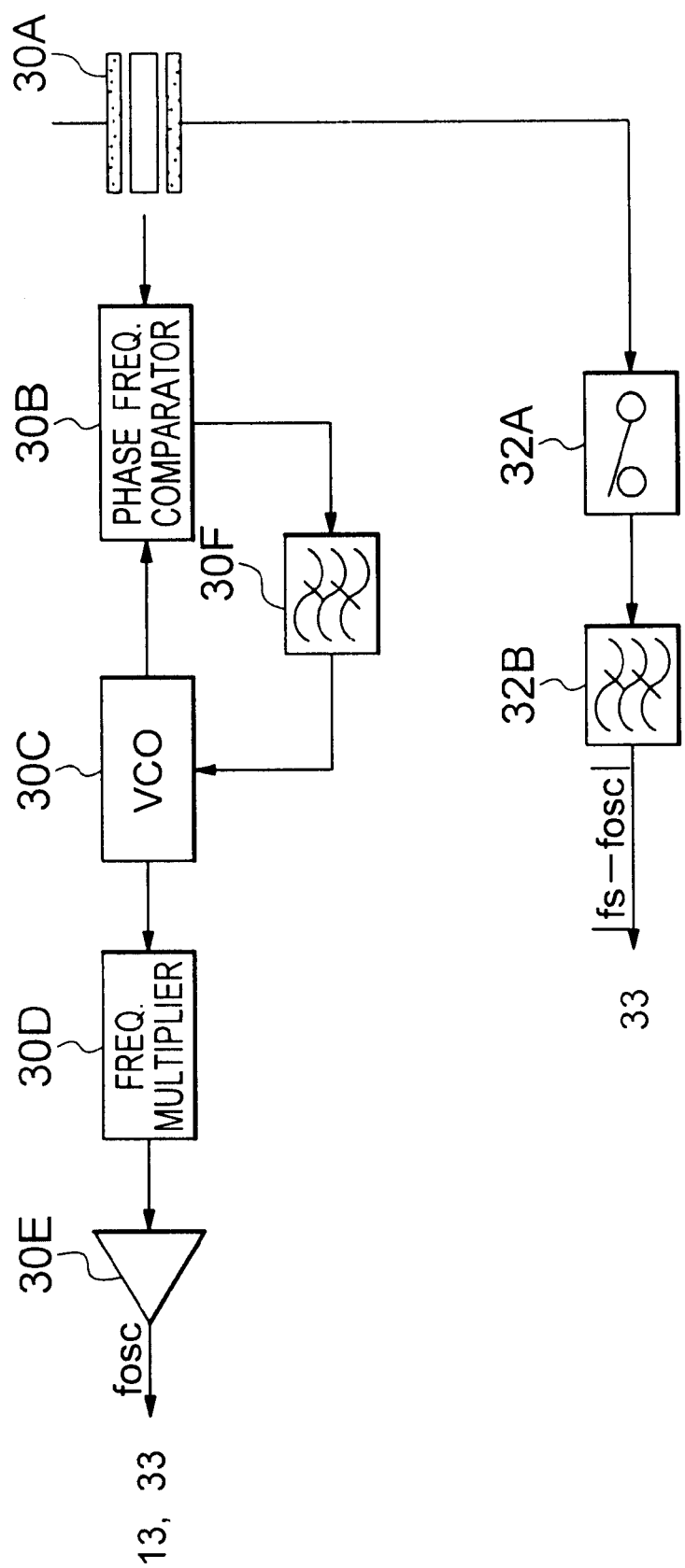
FIG. 5 is a block diagram illustrating the constitution of a local oscillator according to an embodiment 4 of the present invention.

FIG. 5 is a block diagram illustrating the local oscillators 30 and 32 according to an embodiment 4 of the invention using a reference frequency oscillator 30A in common.

In FIG. 5, the local oscillator 30 that forms the car-mounted equipment frequency fosc is constituted by the reference frequency oscillator 30A, a phase frequency comparator 30B, a VCO (voltage-controlled oscillator) 30C, a frequency multiplier 30D, an amplifier 30E, and a loop filter 30F.

Further, the local oscillator 32 that forms the intermediate frequency |fs−fosc| is constituted by the reference frequency generator 30A, a switch 32A and a second filter 32B (hereinafter simply referred to as "filter").

The reference frequency oscillator 30A common for the local oscillators 30 and 32 produces a reference frequency equal to the intermediate frequency |fs−fosc| or produces such a reference frequency that a harmonic thereof is equal to the intermediate frequency |fs−fosc|.

The phase frequency comparator 30B compares the reference frequency from the reference frequency oscillator 31A with the oscillation frequency from the VCO 30C, and feeds an output frequency to the VCO 30C through the loop filter 30F.

The frequency multiplier 30D multiplies the oscillation frequency of the VCO 30C based on the reference frequency oscillator 30A to form the car-mounted equipment frequency fosc, and the amplifier 30E amplifies the car-mounted equipment frequency fosc and feeds it to the mixers 13 and 33.

The switch 32A is closed (on) when the local oscillator 32 is in operation to permit the passage of the reference frequency (harmonic) from the reference frequency oscillator 30A.

The filter 32B is a band-pass filter which picks up the intermediate frequency |fs−fosc| from the reference frequency and outputs it to the mixer 33.

Here, a secondary or a tertiary harmonic of the reference frequency oscillator 30A is used as the intermediate frequency |fs−fosc|. The filter 32B that permits the passage of the intermediate frequency |fs−fosc| only is inserted in a stage succeeding the output portion of the reference frequency oscillator 30A.

By using the frequency (or harmonic) of the reference frequency oscillator 30A as the intermediate frequency |fs−fosc| of the local oscillator 32, the local oscillator 32 can be used in combination with the reference frequency of the local oscillator 30, presenting advantage in the area for mounting the whole car-mounted equipment and in the cost of production.

What is claimed is:

1. A DSRC car-mounted equipment comprising:
   a transmission/reception antenna for executing communication with an on-the-road equipment installed on a road;
   a transmission/reception change-over switch for changing over the transmission/reception function of said transmission/reception antenna;
   a transmission/reception circuit including a reception circuit and a transmission circuit selectively connected to said transmission/reception antenna via said transmission/reception change-over switch;
   a first local oscillator for generating a car-mounted equipment frequency related to said transmission/reception circuit;
   a demodulator for detecting the electric field intensity and for picking up reception data from a signal received by said reception circuit;
   a car-mounted controller for fetching said reception data by controlling the change-over of said transmission/reception change-over switch, and for sending transmission data to said transmission circuit;
   an information output means connected to said car-mounted controller; and
   a second local oscillator that outputs, to said transmission circuit, a frequency for detecting abnormal condition corresponding to an on-the-road equipment frequency transmitted from said on-the-road equipment; wherein
   said car-mounted controller includes an abnormal circuit judging means for judging the condition of said transmission/reception circuit by using said frequency for detecting abnormal condition; and
   said abnormal circuit judging means judges said transmission/reception circuit to be abnormal and drives said information output means when at least either the electric field intensity or the reception data detected based upon a leakage power of said frequency for detecting abnormal condition is not satisfying a predetermined condition in a state where said transmission/reception change-over switch is connected to said reception circuit.

2. A DSRC car-mounted equipment according to claim 1, further comprising an abnormal condition detector switch which selectively connects said first or the second local oscillator to said transmission circuit; wherein
   said second local oscillator outputs a frequency equal to said on-the-road equipment frequency as said frequency for detecting abnormal condition; and
   said abnormal circuit judging means judges the condition of said transmission/reception circuit by comparing the electric field intensity detected based on a leakage power of said frequency for detecting abnormal condition with a predetermined value in a state where said abnormal condition detector switch is connected to said second local oscillator side.

3. A DSRC car-mounted equipment according to claim 2, wherein said abnormal condition detector switch is connected to said second oscillator when the power source circuit is closed, said second local oscillator is driven when the power source circuit is closed, and said transmission circuit is turned off when the power source circuit is closed.

4. A DSRC car-mounted equipment according to claim 2, wherein said abnormal circuit judging means sends a predetermined data that has been set in advance to said transmission circuit, and judges the condition of said transmission/reception circuit by comparing the electric field intensity and the reception data with a predetermined value and said predetermined data, said electric field intensity and said reception data being detected based on a leakage power of said frequency for detecting abnormal condition ASK-modified with said predetermined data.

5. A DSRC car-mounted equipment according to claim 1, further comprising:
- a mixer for detecting abnormal condition inserted between said first and second local oscillators and said transmission circuit; and
- a filter inserted between said mixer and said transmission circuit to permit the passage of said on-the-road equipment frequency and said car-mounted equipment frequency only; wherein
- said second local oscillator is selectively driven and outputs, as said frequency for detecting abnormal condition, an intermediate frequency which is a difference between said on-the-road equipment frequency and said car-mounted equipment frequency; and
- said abnormal circuit judging means judges the condition of said transmission/reception circuit by comparing the electric field intensity detected based on a leakage power of said frequency for detecting abnormal condition with a predetermined value when said second local oscillator is driven.

6. A DSRC car-mounted equipment according to claim 5, wherein said second local oscillator is driven when the power source circuit is closed, and said transmission circuit is turned off when the power source circuit is closed.

7. A DSRC car-mounted equipment according to claim 5, wherein said abnormal circuit judging means sends a predetermined data to said transmission circuit, and judges the condition of said transmission/reception circuit by comparing the electric field intensity and the reception data with a predetermined value and said predetermined data, said electric field intensity and said reception data being detected based on a leakage power of said frequency for detecting abnormal condition ASK-modified with said predetermined data.

8. A DSRC car-mounted equipment according to claim 5, wherein said first and second local oscillators include a common reference frequency oscillator for outputting a reference frequency inclusive of said intermediate frequency, said first local oscillator has a frequency multiplier for forming said car-mounted equipment frequency from said reference frequency, and said second local oscillator has a second filter for picking up said intermediate frequency from said reference frequency.

9. A DSRC car-mounted equipment according to claim 1, wherein said information output means includes at least either a buzzer or a display unit to inform the abnormal condition of said transmission/reception circuit by voice or display.

10. A DSRC car-mounted equipment according to claim 1, further comprising an external storage medium connected to said car-mounted controller to transmit and receive data related to the toll collection, wherein said car-mounted controller exchanges the data related to the toll collection between said on-the-road equipment installed on a toll road and said external storage medium, and automatically executes the toll collection processing based on the data related to the toll collection.

* * * * *